United States Patent [19]
Jobelius et al.

[11] Patent Number: 5,735,371
[45] Date of Patent: Apr. 7, 1998

[54] CYLINDER PISTON DEVICE

[75] Inventors: Klaus-Dieter Jobelius, Boppard; Helmut Morgen, Mannebach; Heinrich Spurzem, Mayen; Stefan Volpel, Koblenz, all of Germany

[73] Assignee: Stabilus GmbH, Koblenz, Germany

[21] Appl. No.: 559,852

[22] Filed: Nov. 20, 1995

Related U.S. Application Data

[63] Continuation-in-part of Ser. No. 821,190, Jan. 15, 1992, Pat. No. 5,485,987.

[30] Foreign Application Priority Data

Jan. 21, 1991 [DE] Germany .......................... 41 01 567.3
Sep. 26, 1995 [DE] Germany .......................... 195 35 711.6

[51] Int. Cl.$^6$ ................ F16F 9/02; F16F 9/34; F05F 3/02; F05F 15/02
[52] U.S. Cl. ............... 188/276; 188/322.17; 188/322.21
[58] Field of Search ................. 267/64.28, 119, 267/129; 188/322.21, 321.11, 321.17, 276, 277

[56] References Cited

U.S. PATENT DOCUMENTS

| | | |
|---|---|---|
| 4,044,866 | 8/1977 | Ishida .......................... 188/322.21 |
| 4,342,448 | 8/1982 | Wallis . |
| 4,360,192 | 11/1982 | Ishida . |
| 4,485,899 | 12/1984 | Grundei . |
| 4,508,020 | 4/1985 | Szcupak . |
| 4,736,824 | 4/1988 | Dony et al. . |
| 4,958,706 | 9/1990 | Richardson et al. . |
| 4,988,081 | 1/1991 | Dohrmann . |
| 5,064,030 | 11/1991 | Wössner . |
| 5,088,698 | 2/1992 | Wallis .......................... 267/119 |
| 5,454,445 | 10/1995 | Kundmüller et al. .......... 188/321.11 |

FOREIGN PATENT DOCUMENTS

| | | | |
|---|---|---|---|
| 651240 | 3/1993 | Australia ............... 188/322.17 |
| 3901449 | 2/1990 | Germany . | |

*Primary Examiner*—Matthew C. Graham
*Attorney, Agent, or Firm*—Baker & Botts, L.L.P.

[57] ABSTRACT

According to an illustrative example of the invention, a gas spring is provided with an emergency exit permitting escape of pressurized gas in the event the gas pressure exceeds a predetermined level or in the event of a dangerously high temperature. The emergency exit includes one or more fluid passages connecting the interior of the gas spring to atmosphere and a cooperating seal member for maintaining the fluid passage or passages closed under normal operating conditions. Upon the occurrence of unduly high pressures or temperatures, a destructible or deformable support for the seal or a fluid passage-bearing member permits relative movement of the seal and the cooperating fluid passage so as to open the fluid passage. As an intermediate step of pressure relief, the structure for mounting the gas spring in its environment of use, e.g. a motor vehicle, may be designed to fail under emergency conditions, e.g., fire, thereby permitting a full extension of the piston rod.

53 Claims, 7 Drawing Sheets

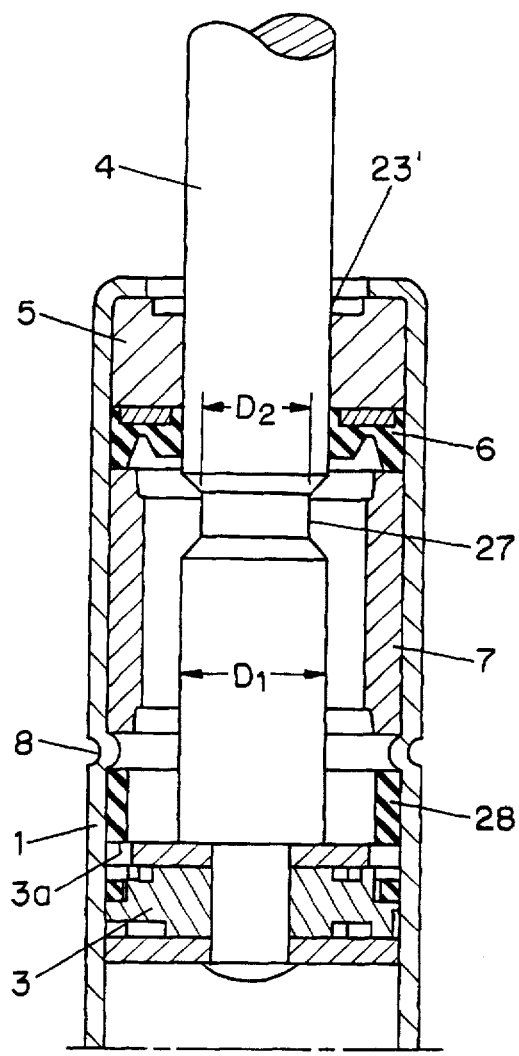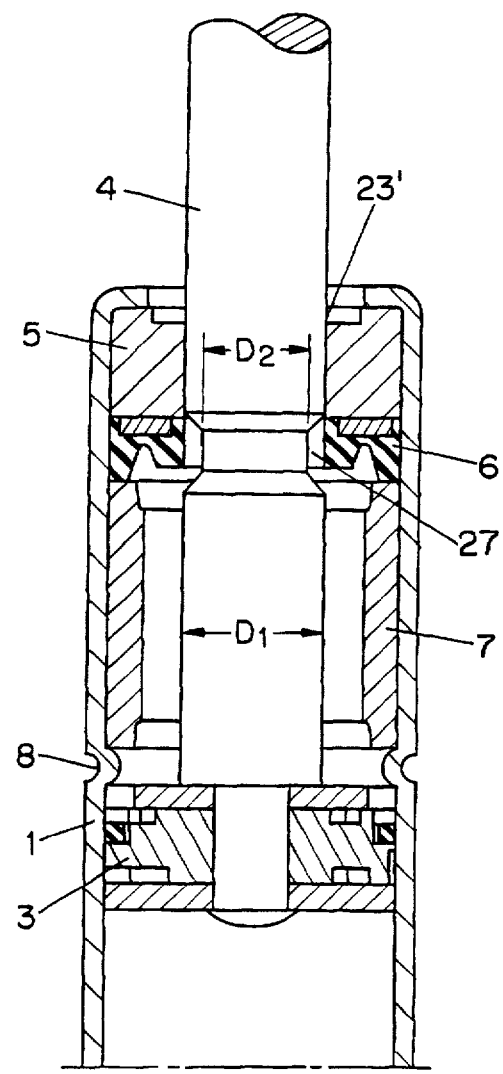

5,735,371

CYLINDER PISTON DEVICE

CROSS REFERENCE TO RELATED APPLICATIONS

The present application is a continuation-in-part of application Ser. No. 07/821,190 filed on Jan. 15, 1992, now U.S. Pat. No. 5,485,987 (Jan. 23, 1996).

BACKGROUND OF THE INVENTION

Cylinder piston devices like gas springs, hydropneumatic springs or hydromechanic springs are frequently used as positioning and gravity compensating elements in many mechanical constructions, for example, in motor vehicles for positioning and weight compensation of boot flaps or engine hoods. Moreover, such cylinder piston devices are used as pressure storing elements. The extension force of such cylinder piston devices is adapted to the specific applications by selecting the pressure of a fluid within the respective cylinder piston device. The pressure of this fluid within the cylinder piston device can be increased considerably beyond the respective normal operational pressure by increase of temperature or by mechanical deformation of the device itself or of the mechanical construction incorporating the cylinder piston device.

STATEMENT OF THE PRIOR ART

From the German patent application 24 57 938 it is known to provide breaking points on at least one of the cylinder and the piston rod to act as emergency exit for the respective pressurized fluid. In case of temperature increase by fire or in case of mechanical deformation of the respective vehicle by a crash accident, the cylinder or piston rod can break. Thus the pressurized fluid can escape. There is, however, a risk that parts of the cylinder piston device will be separated from the remainder of the cylinder piston device at the breaking points. The separated parts may be propelled at high velocity by the escaping pressurized fluid and present a risk of damage or injury to sensitive parts of the respective mechanical construction and persons standing close to the cylinder piston device.

OBJECT OF THE INVENTION

It is a primary object of the present invention to provide a cylinder piston device with an emergency exit for the pressurized fluid in which escape of the pressurized fluid is permitted under emergency conditions without the risk of breakage or expulsion of constructional members.

It is a further object of the present invention to provide a cylinder piston device which is in case of an opening of the emergency exit still operable at least to such an extent that the piston rod is still axially guided by the cylinder.

It is a further object of the present invention to provide a cylinder piston device in which the opening of the emergency exit occurs within a relatively narrow range adjacent a predetermined temperature and/or within a narrow range adjacent a predetermined pressure of the fluid.

It is a further object of the present invention to provide a cylinder piston device which can be easily and at low costs manufactured in accordance with usual design principles.

SUMMARY OF THE INVENTION

A cylinder piston device comprises a cylinder having an axis, a circumferential wall and two ends and defining a cavity within the cylinder member axially between the two ends. A piston rod is axially guided through at least one of the two ends by piston rod guiding and sealing means. A volume of pressurized fluid is provided within the cavity and acts on the piston rod. An emergency exit permits escape of fluid from the cavity under emergency conditions. The piston rod is telescopically movable with respect to the cylinder against the action of the pressurized fluid. The cylinder and the piston rod have basic operational shapes. The basic operational shapes of the cylinder and the piston rod are substantially unchanged in case of an opening of the emergency exit. As the shape of the cylinder and the shape of the piston rod remain substantially unchanged in case of an opening of the emergency exit, there is no risk of parts of the cylinder and the piston rod being propelled into the surrounding space by the escaping pressurized fluid.

The piston rod remains telescopically movable with respect to the cylinder along most or all of an operational stroke of the piston rod in case of the emergency exit being opened. As a result thereof, the constructional parts of the construction incorporating the cylinder piston device are still movable with respect to each other when the emergency exit is opened due to increased temperature or due to increased pressure. While the expected function of the cylinder piston device of, for example, weight compensation, is not further fulfilled after escape of the pressurized fluid, the movement of the respective parts of the mechanical constructions by hand is not prevented. This can be of considerable value in case of an accident, especially a fire accident.

If the piston rod is provided with a piston unit within a cavity and the piston unit is movable along an operational range of movement with respect to the cylinder, the emergency exit is preferably located at a location of the cylinder axially outside of the operational range of movement.

According to a preferred design principle, the emergency exit comprises a fluid passage for connecting the cavity with atmosphere and a valve or seal member for cooperating with the fluid passage to open or close the emergency exit. In response to a predetermined value of at least one of the pressure of the fluid and the temperature at a temperature-sensing location of the cylinder piston device, at least one of the fluid passage and the seal is movable from a closed status, in which the fluid passage and the seal are in mutually sealing relation to one another, to an open status, in which the fluid passage and the seal are out of such mutually sealing relation. The fluid passage is thus closed during normal operating conditions, but is opened to permit escape of fluid under emergency conditions.

In order to prevent expulsion of the seal, the cylinder piston device may comprise catching means for preventing separation of the seal from the cylinder piston device in case of transition of the seal from the closed status towards the open status. These catching means may be provided by the cavity itself when the seal is provided within the cavity.

Preferably the fluid passage and the seal are located at a location outside the normal operational range of movement of a piston unit connected with the piston rod inside the cavity. Thus any conflict of the piston unit with the fluid passage seal is avoided. For example, the fluid passage and the seal may be located adjacent the guiding and sealing means for the piston rod or, alternatively, adjacent the end wall of the cylinder remote from the guiding and sealing means. As will be apparent, such an emergency exit could be provided adjacent both ends of the cylinder if desired.

The seal may be a sliding seal movable along a sliding face of the cylinder piston device and the fluid passage may intersect with the sliding face. Alternatively, the seal may remain stationary and the fluid passage may be moved relative to the seal.

In a preferred embodiment, either the seal member or a member carrying a part or all of the fluid passage is directly subject to the pressure of the pressurized fluid and is supported in the closed status of the emergency exit by support means against the action of the pressurized fluid acting onto the seal or fluid-passage bearing member, as the case may be. The support means may be sensitive to the predetermined value of either the pressure of the fluid and/or the temperature at the temperature-sensing location of the cylinder piston device. The temperature-sensing location is preferably the location of the support means. In accordance with the invention, the support means is destroyable or deformable in response to the predetermined value of pressure of the pressurized fluid or, alternatively, to the predetermined value of temperature. According to a further alternative, the support means may be destroyable or deformable by the combined action of increased pressure and increased temperature.

A still further alternative is to provide support means having a temperature-sensitive support capability decreasing with increasing temperature such that at the predetermined value of temperature, the support capability is insufficient to maintain the seal or the fluid-passage bearing member in the closed status against the action of the pressurized fluid.

The support means may also be elastic support means according to a further alternative.

A further design principle is possible according to which the seal is destroyable or deformable in response to the predetermined value of at least one of: pressure of the fluid and temperature at a temperature-sensing location of the cylinder piston device.

In order to obtain a most simple mechanical design, a substantially cylindrical internal sliding face may be provided adjacent the circumferential wall of the cylinder. In this case, the sliding seal may be an annular seal cooperating with the substantially cylindrical internal sliding face.

The annular seal may comprise a piston rod seal located radially between the cylindrical wall and the piston rod. In this case, the piston rod seal fulfills an emergency fluid escape function in addition to its main function of establishing a seal between the cylinder and the piston rod. Thus the total design becomes less expensive and requires a reduced number of components.

The annular seal may be axially supported by one end of an annular support member. This annular support member may be axially supported adjacent its other end by the cylinder. Again, the annular support member may be sensitive to the predetermined value of at least one of: pressure of the fluid and temperature at the temperature-sensing location.

A preferred form of the annular support member comprises two axially adjacent and radially offset ring portions interconnected by a radial connection or bridge, which radial connection is destroyable in response to a predetermined axial force exerted by the pressurized fluid through the annular seal onto the annular support member. Thus the ring portions are telescopically movable with respect to each other in response to destruction of the radial connection therebetween. The radial connection may be an integral part of the ring portions.

Alternatively, the annular support member may be made of a material of a rigidity decreasing with increasing temperature. Thus in case of a fire accident the support member becomes weaker and is finally overcome by the force exerted by the pressurized fluid.

There is further the possibility of using an annular support member comprising annular spring means. These annular spring means may, for example, comprise a stack of cup springs.

The fluid passage may comprise at least one bore extending in radial direction through the circumferential wall at or adjacent the substantially cylindrical internal sliding face. Thus the bore may be covered or uncovered according to the axial position of the annular seal. Alternatively, the fluid passage may comprise at least one substantially axially extending groove adjacent the substantially cylindrical internal sliding face. In this case, the fluid passage is opened when the groove extends across the annular seal.

In still another embodiment, the fluid passage may be formed as a groove in the piston rod and the annular seal may remain stationary relative to the cylinder. The emergency fluid passage is opened when the piston rod groove is moved across the annular seal. The annular support member in this case abuts a surface, e.g., the piston, on the piston rod and prevents the piston rod groove from moving into radial alignment with the seal under normal operating conditions. Upon destruction or deformation of the annular support member under emergency conditions, however, the piston rod groove moves into alignment with the seal to open the emergency exit.

The design principle of a destroyable or deformable seal or support member may also be realized in practice as follows: the seal is an annular seal member located radially between the circumferential cylinder wall and the piston rod and is subject to the pressure of the pressurized fluid. The annular seal is axially supported against the pressure of the pressurized fluid by an annular support face. This annular support face supports only one of two radially adjacent ring portions of the annular seal. A second one of the ring portions is unsupported. The first and the second ring portions of the seal member are axially shearable with respect to each other in response to the predetermined value of the pressurized fluid. The shearing stability may be also influenced by the temperature. Also with this embodiment, the annular seal may be an annular piston rod sealing member, so that the annular seal fulfills a dual function. The annular seal may comprise in such a construction a resilient sealing material reinforced by a reinforcing ring. This reinforcing ring may be provided with a weakened zone sensitive to shearing forces.

The emergency fluid passage may comprise a fluid collecting chamber within the cylinder. The fluid collecting chamber may have an exit to the atmosphere.

The piston rod guiding and sealing unit may comprise an annular guide having an internal guiding surface. In such a construction, the emergency fluid passage may comprise at least one substantially axially extending groove in the guiding surface. Alternatively, the fluid passage may be formed by an annular clearance between the piston rod and the surrounding surface of the guide.

The pressurized fluid is preferably a pressurized gas. In this case, the cylinder piston device acts as a so-called gas spring.

The various features of novelty which characterize the invention are pointed out with particularity in the claims annexed hereto and forming a part of the disclosure. For a better understanding of the invention, its operating advantages and the specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings, in which

FIGS. 8 and 9 show still another embodiment of the invention, in which the emergency fluid passage is formed in part by a reduced diameter portion of the piston rod and the destroyable or deformable support ring abuts the piston.

DETAILED DESCRIPTION OF THE PREFERRED EMBODIMENTS

Figure 7:
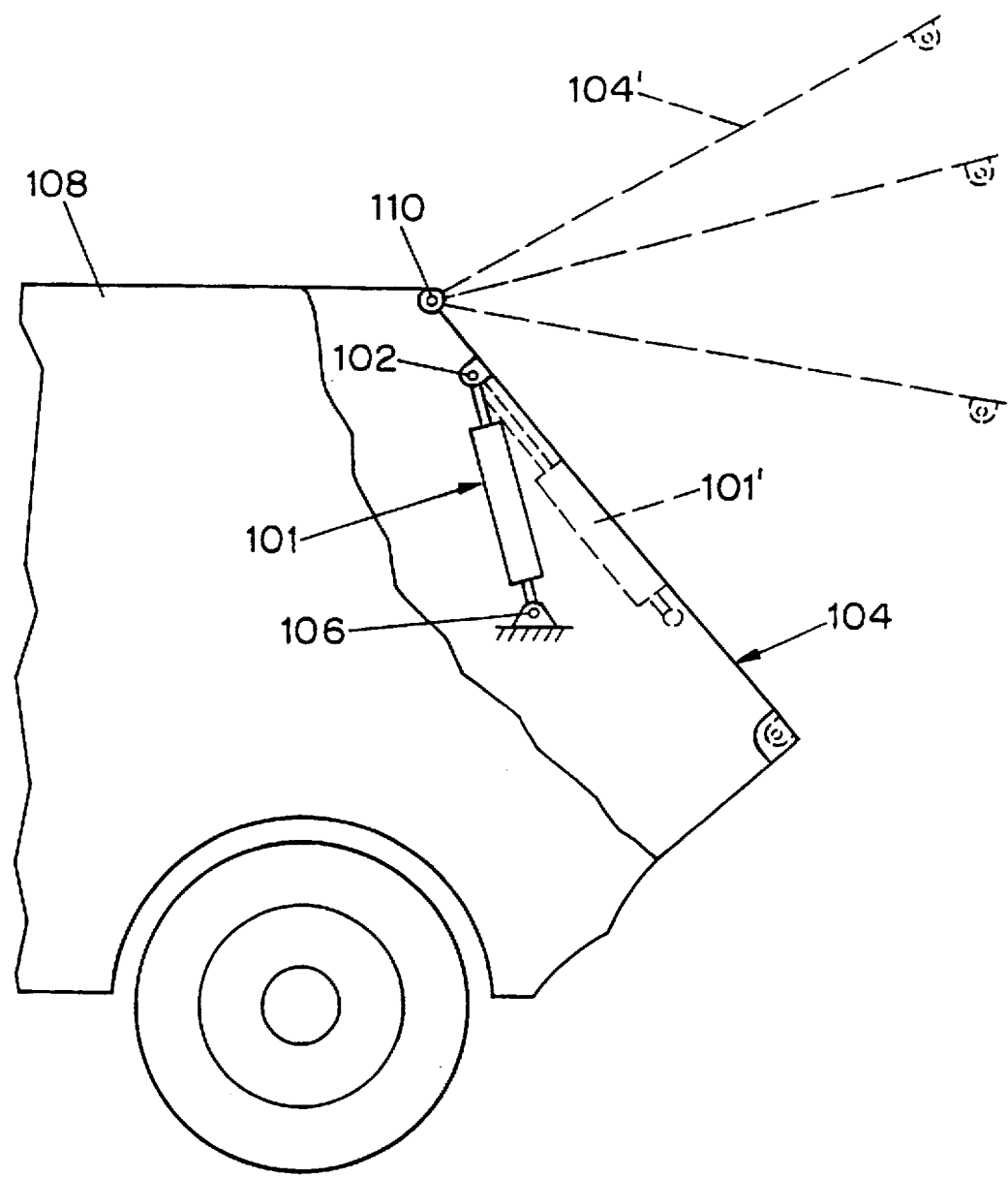
FIG. 7 schematically illustrates a pressurized cylinder piston device in its normal operational relationship to the body and a rear door of a motor vehicle, and also showing in phantom one end of the device disconnected from the vehicle body in the case of an emergency.

When employing cylinder piston devices in the construction of motor vehicles to simplify operating of the boot flap or the engine hood, pneumatic or hydropneumatic springs are preferred. For this purpose, the cylinder piston device is articulated, on the one hand, to the flap or hood and, on the other hand, to a part which is rigid with respect to the chassis. This is illustrated in FIG. 7, where a gas spring 101 is pivotally connected at the rod end 102 to the trunk lid or rear door 104 of a vehicle and at the cylinder end 106 to the vehicle body 108. As is well known in the art, the gas spring assists in moving the door 104 about the axis 110, against the force of gravity, from the closed position shown in solid lines at 104 to the open positions shown in phantom lines at 104'.

In accordance with the invention, the emergency exit for escape of the pressurized fluid within the gas spring 101 may be so provided that the gas can escape while the gas spring remains fully attached to the vehicle door 104 and body 108 or, alternatively, one or both of the end fittings carried by the gas spring (or the cooperating mounting elements carried by the vehicle) may be destroyable or deformable in the event of fire or other emergency condition so as to free the gas spring from attachment to the vehicle at one or both ends of the spring. This is depicted in phantom in FIG. 7, where the cylinder end of the gas spring 101' is shown as free of connection to the vehicle body 108. In this latter case, the resulting extension of the gas spring alone will result in a rapid decrease in the internal fluid pressure. Whether or not provision is made for the gas spring 101 to break free of attachment to the vehicle, one or more emergency exits are provided to release fluid pressure to the atmosphere to prevent the rupture of the gas spring in the event of excessively high levels of pressure and/or temperature. Various embodiments of such emergency exits are described hereinbelow.

Figure 1:
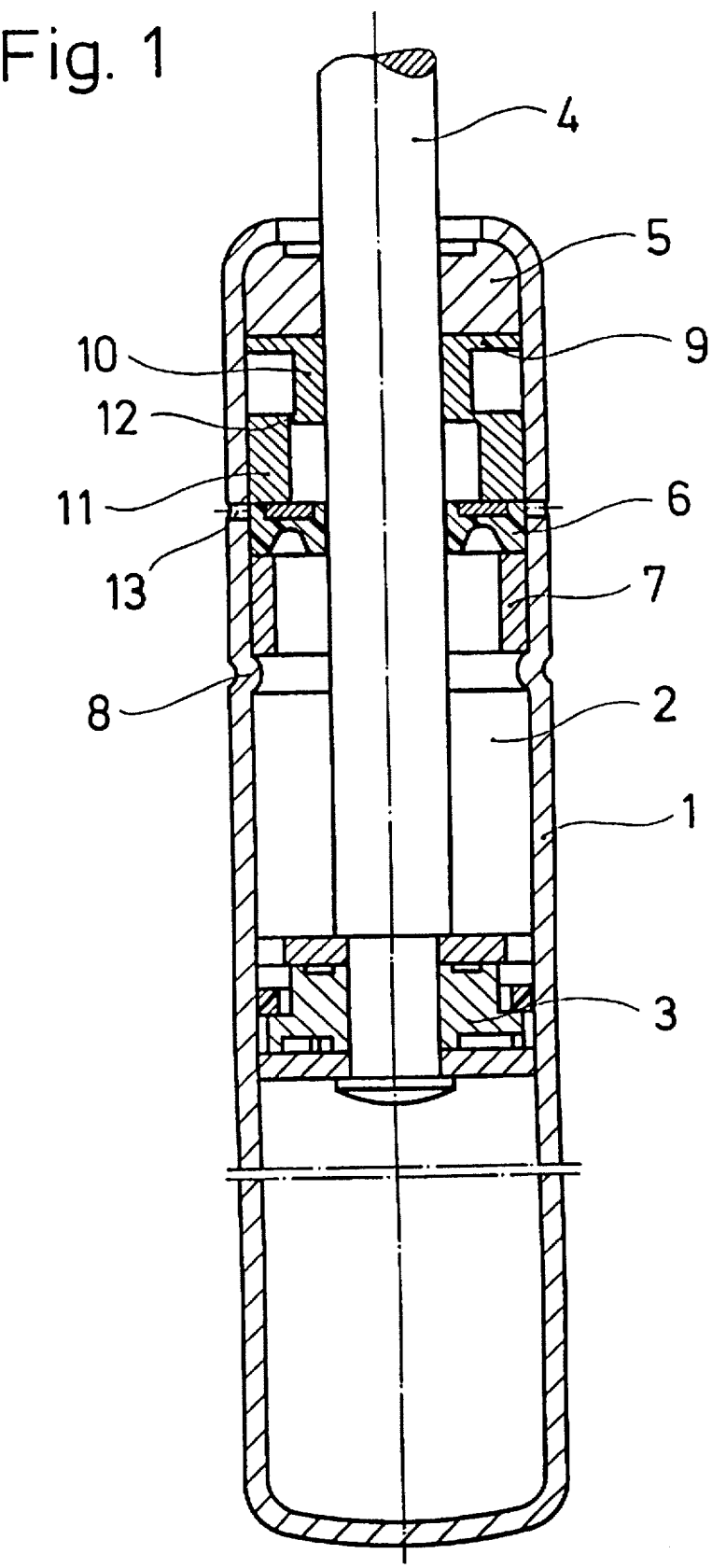
FIG. 1 is a longitudinal section through a pneumatic gas spring with a destroyable support ring.

The gas spring according to FIG. 1 has a cylinder 1, in the cavity 2 of which there is provided a pressurized fluid such as a gas. A piston rod 4 is provided with a piston 3 and is guided through a piston rod guide 5 and a piston rod seal 6 in the cylinder 1. The cavity 2 is sealed from the exterior by the seal 6. At least a small quantity of liquid lubricant (not shown) is provided in the cavity 2 for lubricating the piston rod 4. A spacer bush or ring 7 is supported at one end by a radially inwardly directed annular projection 8 on the cylinder 1 acting as a stop and, at the other end, serves as an abutment for the piston rod seal 6. Between the piston rod guide 5 and the piston rod seal 6 there is located a destroyable support bush or ring 9, which consists of a radially inner ring portion 10 and a radially outer ring portion 11 joined by a connecting bridge 12. The connecting bridge 12 is dimensioned so that it breaks from a predetermined axial force acting onto the support bush 9. In this case, the outer ring portion 11 slides over the inner ring portion 10, whereby the piston rod seal 6 can move axially upwardly and, in so doing, pass over and clear fluid passages or bores 13 arranged in the cylinder 1. The pressurized fluid in the cavity 2 can thereby escape to the atmosphere via the bores 13 owing to the displacement of the piston rod seal 6. Protection against excess pressure is provided in this way, avoiding an unallowably high rise in pressure in the cavity 2. The connecting bridge 12 of the support bush 9 is designed such that it breaks only when the pressure in the cavity 2 exceeds a predetermined pressure above the operating pressure, which can occur, for example, during a fire in the vehicle.

Figure 2:
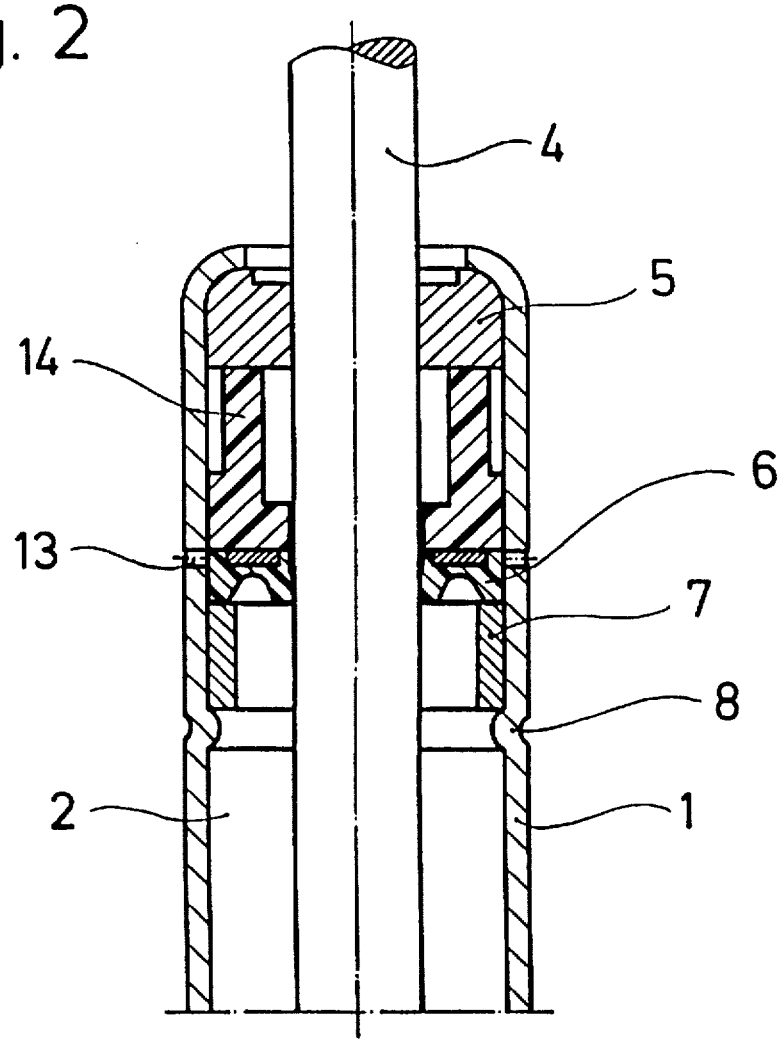
FIG. 2 shows a detail of a gas spring in the region of the piston rod seal with a support ring weakenable at increasing temperatures.

In the embodiment according to FIG. 2, the annular support member 14 arranged between the piston rod guide 5 and the piston rod seal 6 is composed of a thermoplastic polymer. The yieldability of this support bush 14 is so great at a predetermined temperature that the piston rod seal 6 clears the bores 13, thereby venting the cavity 2 to the atmosphere so that, at an unallowably high temperature of the gas spring, the pressure can be released from the cavity 2. In FIG. 2 and the remaining figures, parts which are equivalent to those parts of FIG. 1 are designated by the same reference numerals.

Figure 3:
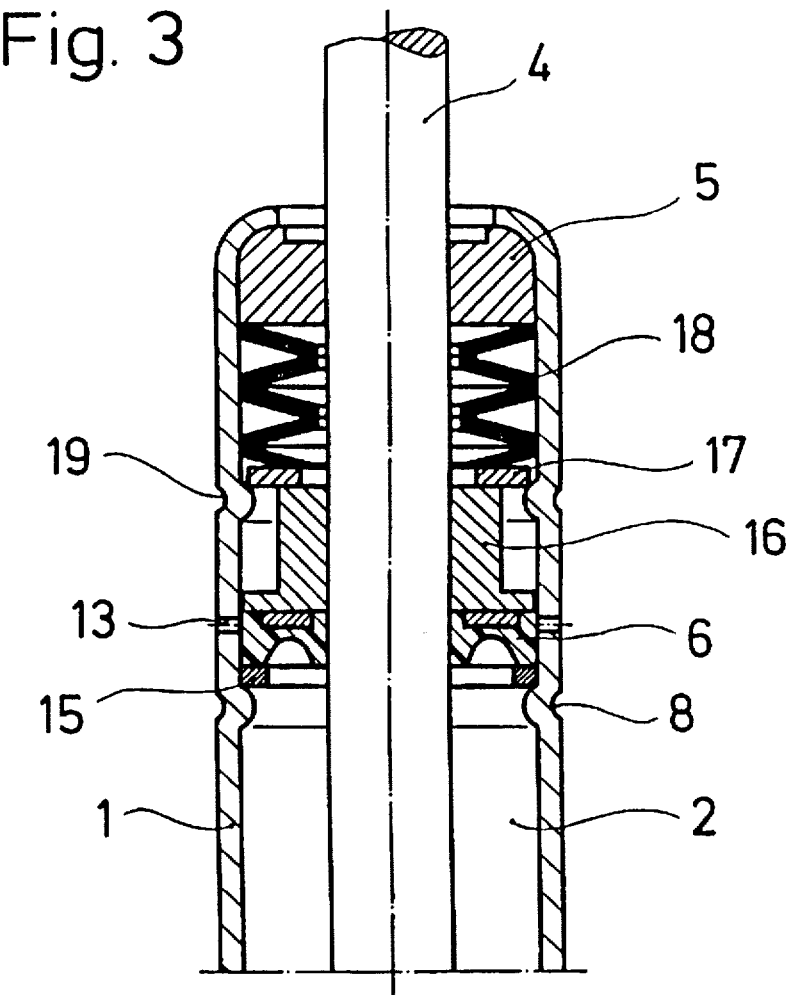
FIG. 3 shows the region of the piston rod seal of a gas spring with a support spring.

The embodiment according to FIG. 3 exhibits a piston rod seal 6 which is supported against the pressure in the cavity 2 via a pretensioned spring formed by Belleville spring washers 18. The Belleville spring washers 18 are supported, on the one hand, on a lower end face of the piston rod guide 5 and act onto a contact ring 17, the axial movement of which is limited by a stop 19 on the cylinder wall. A spacer ring 16 abuts the piston rod seal 6 and cooperates with the contact ring 17 so that, in the event of an unallowably high rise in temperature or pressure in the cavity 2, the piston rod seal 6 is displaced upwardly against the force of the prestressed Belleville spring washers 18. The connection between the cavity 2 and the atmosphere via the bores 13 is thereby opened. An abutment ring 15 which is supported on the projection 8 on the inner wall of the cylinder 1 is provided for limiting the piston rod seal 6 axially relative to the cavity 2.

Figure 4:
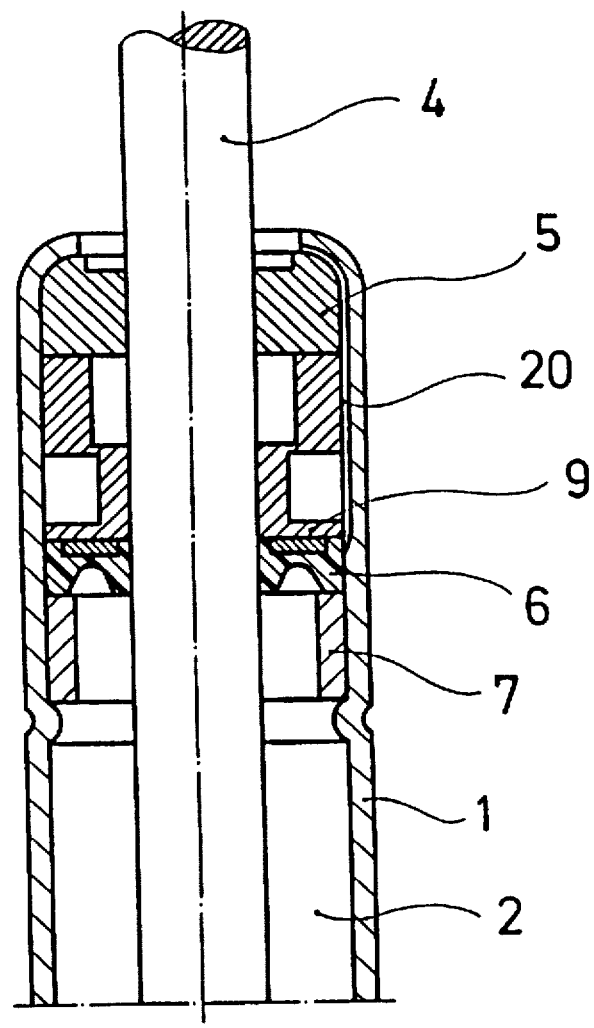
FIG. 4 shows the region of the piston rod seal of a gas spring, wherein the emergency fluid passage is formed by a longitudinal groove in the cylinder member.

The embodiment shown in FIG. 4 differs from that of FIG. 1 essentially in that a longitudinal groove 20 located in the inner wall of the cylinder 1 forms the emergency exit fluid passage in cooperation with the piston rod seal 6. The longitudinal groove 20 axially bridges the support bush 9 and the piston rod guide 5 and opens to the atmosphere. As the pressure in the cavity 2 rises above a maximum permitted extreme pressure, the support bush 9 is slid together by breakage of the connecting bridge and the piston rod seal 6 moves axially into alignment with the longitudinal groove 20. The connection between the cavity 2 and the atmosphere via the longitudinal groove 20 is thus produced. The longitudinal groove 20 is advantageously formed by cold working so that no splinters or burrs are formed, which could impair operation of the cylinder piston device.

Figure 5:
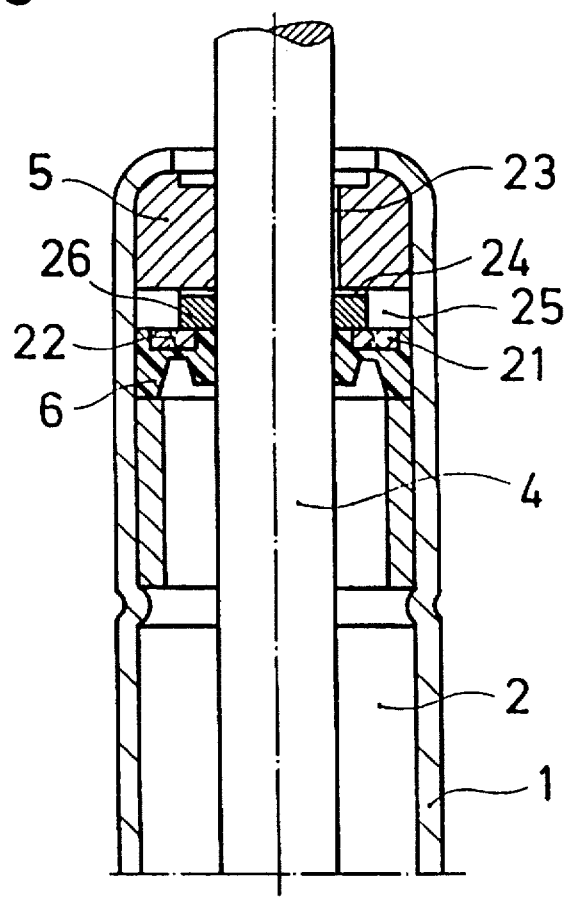
FIG. 5 shows a further embodiment in which the piston rod seal is provided with a destroyable disk.
Figure 6:
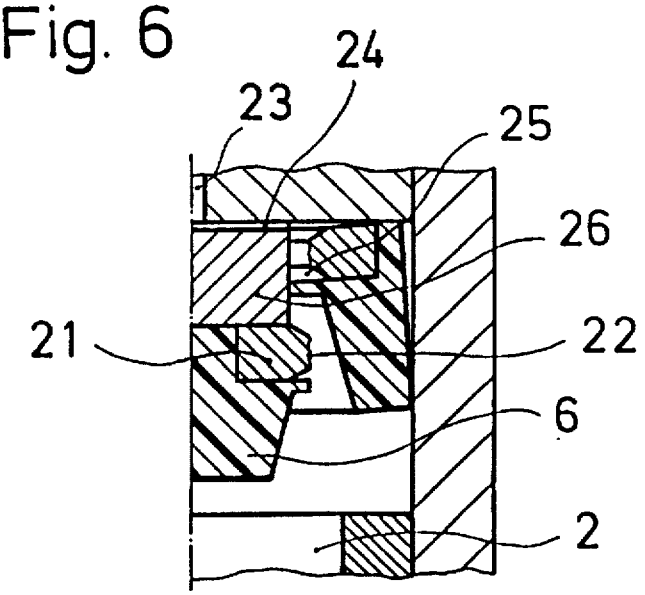
FIG. 6 shows the gas spring according to FIG. 5 with the disk broken.

A further embodiment of a cylinder piston device shown in FIGS. 5 and 6 comprises a shearable disk 21 which is embedded in the piston rod seal 6. The upper end face of the piston rod seal 6 rests on an abutment ring 26 which forms a chamber 25 with the internal wall of the cylinder 1. This chamber 25 communicates with the atmosphere via at least one radially extending channel or passage 24 in the ring 26 and an axial groove or passage 23 in the piston rod guide 5. The axial groove 23 can be replaced by a clearance between the piston rod 4 and the piston rod guide 5, thus forming an axial passage which is annular in cross section. The shearable disk 21 has a predetermined breaking point 22 which is designed so that the shearable disk is sheared if a maximum allowable pressure in the cavity 2 is exceeded. The piston rod seal 6 may also be divided in such situation, and the radially outer part of the piston rod seal 6 resting against the internal wall of the cylinder 1 is pressed with the associated part of the shearable disk 21 into the chamber 25, as shown in FIG. 6. The connection between the cavity 2 and the atmosphere via the fluid passages 23, 24 is thus produced, thereby reducing the internal pressure of the gas spring to an acceptable level.

In the embodiment of FIGS. 8 and 9, the piston rod seal 6 is axially captured between the guide 5 and a spacing bush 7, which in turn abuts a projection 8 on the inner wall of the cylinder 1. The emergency fluid passage in this case comprises the annular clearance 23' between the piston rod member 4 and the surrounding guide 5, together with a portion 27 of the piston rod member 4 of reduced diameter D2 relative to the diameter D1 of the piston rod. During normal operating conditions, as shown in FIG. 8, the reduced diameter portion 27 is maintained out of bridging relationship with the seal 6 by a destructible or deformable annular support member 28 interposed between the projection 8 and the upper surface 3a of a piston unit 3 carried by the piston rod 4.

Upon the occurrence of unduly high pressure or temperature conditions, the annular support member 28 collapses, deforms, or melts away and the piston rod 4 is urged outward of the cylinder member 1 by the action thereon of the pressurized fluid until the reduced diameter portion 27 bridges the seal 6. As shown in FIG. 9, the connection of the cylinder cavity 2 to atmosphere is thereby opened, and the gas pressure within the cylinder 1 is vented to a safe level.

The support member 28 is preferably formed as a sleeve, which facilitates both manufacture of the part and its assembly, by axial insertion, into the cylinder 1. As a further advantage of the sleeve form of construction, the support 28 may readily be subjected to a radial prestress against the cylinder wall, thereby fixing it in place within the cylinder. The support 28 is preferably made of a fusible material, which melts upon the occurrence of a predetermined excess temperature.

Although the embodiment of FIGS. 8 and 9 may be used when the gas spring remains fully connected to the vehicle under emergency conditions, it is particularly advantageous when employed in the situation illustrated in phantom in FIG. 7, i.e., where the gas spring 101' becomes detached at one end from the vehicle as a result, for example, of melting of the end fitting or vehicle mounting element in the case of fire. In this situation, the normal operating range of movement of the piston rod 4 relative to the cylinder 1, corresponding to the full range of movement of the vehicle door 104, is preferably such that the piston 3 stops short of engagement with the axially inner end of the annular support member 28 at the outermost limit of its normal range of movement. Upon the occurrence of fire (or other emergency condition), the end fitting of the gas spring, the mounting element on the vehicle or even a part of the vehicle itself melts or otherwise weakens so that the fluid pressure acting on the piston rod causes the gas spring to break free of its attachment to the vehicle at one end. The piston rod 4 then moves outward of the cylinder until the piston 3 abuts the inner end of the support member 28, as shown in FIG. 8, thereby producing a first reduction in the internal fluid pressure.

If the fire or other emergency conditions persists and the temperature and/or pressure within the cylinder further increases, the support member 28, which preferably is fusible, melts (or is otherwise deformed or destroyed) and the piston rod 4 moves farther outward under fluid pressure to the position depicted in FIG. 9. In the position of FIG. 9, the reduced diameter portion 27 of the piston rod 4 bridges the seal 6 and vents the fluid pressure to atmosphere via the annular clearance 23' between the piston rod 4 and the guide 5.

While specific embodiments of the invention have been shown and described in detail to illustrate the application of the inventive principles, it will be understood that the invention may be embodied otherwise without departing from such principles.

We claim:

1. A cylinder piston device, comprising:

a cylinder member having an axis, a circumferential wall and two ends, said cylinder member defining a cavity therein between said two ends;

a piston rod member extending through at least one end of the cylinder member;

a piston unit carried by the piston rod member internally of the cylinder member;

piston rod guiding and sealing means for sealingly guiding the piston rod member through said at least one end of the cylinder member for telescopic movement relative to the cylinder member throughout a normal operating range of movement of said piston unit;

a volume of pressurized fluid within said cavity and acting on said piston rod member;

means for permitting escape of fluid from said cavity under emergency conditions, said fluid escape means being located at least in part outside of said normal operating range of movement of said piston unit;

the emergency fluid escape means including (1) at least one fluid passage coupling said cavity to atmosphere, (2) means for sealing said at least one fluid passage against fluid flow therethrough during normal operating conditions and for opening said at least one passage for fluid flow therethrough in emergency conditions, and (3) means for maintaining said fluid passage sealing means and said at least one fluid passage in mutually sealing relation with one another against the pressure of said fluid under normal operating conditions and for permitting axial movement of at least one of said fluid passage sealing means and said at least one fluid passage out of said mutually sealing relation with the other of said fluid passage sealing means and said fluid passage under the action of said fluid pressure upon the occurrence of emergency conditions; and said maintaining means permitting said axial movement in response to the increase in at least one of temperature and pressure beyond respective predetermined values.

2. The cylinder piston device of claim 1, wherein said maintaining means comprises a support member having an axial length which is shortened as a result of at least one of destruction and axial displacement thereof in response to said increase in pressure and/or temperature, whereby said at least one fluid passage and said fluid passage sealing means are moved out of said mutually sealing relation.

3. The cylinder piston device as set forth in claim 2, wherein said support member comprises an axially resilient member; and the axial length of said support member is shortened as a result of resilient axial deformation of said support member.

4. The cylinder piston device as set forth in claim 2, wherein:

said support member comprises an axially collapsible member; and the axial length of said support member is shortened as a result of axial collapse of said support member.

5. The cylinder piston device as set forth in claim 2, wherein:

said support member comprises a plastically deformable member; and the axial length of said support member is shortened as a result of plastic axial deformation of said support member.

6. The cylinder piston device as set forth in claim 2, wherein said support member comprises a prestressed spring member.

7. The cylinder piston device as set forth in claim 1, wherein:

said fluid passage sealing means comprises a seal member that is axially movable out of sealing relation with said at least one fluid passage; and said seal member is moved out of said sealing relation as a result of destruction said seal member upon the occurrence of emergency conditions.

8. The cylinder piston device as set forth in claim 7, further comprising means for preventing separation of said seal member from said cylinder piston device in case of axial movement of said seal member out of sealing relation with said at least one fluid passage.

9. The cylinder piston device as set forth in claim 7, wherein said seal member is annular in cross section and is located axially adjacent to said at least one end of the cylinder member.

10. The cylinder piston device as set forth in claim 9, wherein said seal member is part of said piston rod guiding and sealing means.

11. The cylinder piston device as set forth in claim 1, wherein said piston rod member remains telescopically movable with respect to said cylinder member along at least a major part of said normal operating range of movement in case of said emergency fluid escape means being opened.

12. The cylinder piston device as set forth in claim 1, wherein:

said maintaining means includes a support member for normally supporting said at least one of said fluid passage sealing means and said at least one fluid passage in said sealing relation against the action of said fluid pressure; and said support member has a temperature-sensitive support capability which decreases with increasing temperature such that, at a predetermined value of temperature, the support capability is insufficient to maintain said at least one of said fluid passage sealing means and said at least one fluid passage in said sealing relation against the action of said pressurized fluid.

13. The cylinder piston device as set forth in claim 1, wherein said pressurized fluid is a pressurized gas.

14. The cylinder piston device of claim 1, wherein:

said at least one fluid passage is located adjacent a first end of said cylinder member for connecting said cavity to atmosphere and said fluid passage sealing means includes a sealing unit interposed between said cavity and a first end of said cylinder member and sealingly engaging said circumferential wall of said cylinder member and acting as a closure member closing fluid communication between said cavity and the atmosphere through said at least one fluid passage;

the cavity side of said sealing unit being exposed to said pressurized fluid within said cavity, said maintaining means including sealing unit support means for axially supporting said sealing unit at the axial side thereof adjacent said first cylinder member end so as to maintain said sealing unit in a closing status under normal operational conditions against the pressure of said pressurized fluid acting on said cavity side thereof such that, under normal operational conditions, said sealing unit prevents fluid communication between said cavity and the atmosphere through said emergency exit; and at least a part of said sealing unit being transferable to an opening status by at least one of destruction and axial displacement thereof in response to the fluid pressure within the cavity exceeding a predetermined pressure range of normal operational conditions such that, upon said fluid pressure exceeding said predetermined range, said cavity is connected with atmosphere through said at least one fluid passage.

15. The cylinder piston device as set forth in claim 14, wherein:

said sealing unit support means comprises an axially resilient member; and said sealing unit is transferable to said opening status as a result of resilient axial deformation of said support member.

16. The cylinder piston device as set forth in claim 14, wherein:

said sealing unit support means comprises an axially collapsible member; and said sealing unit is transferable to said opening status as a result of axial collapse of said support member.

17. The cylinder piston device as set forth in claim 14, wherein:

said sealing unit support means comprises a plastically deformable member; and said sealing unit is transferable to said opening status as a result of plastic axial deformation of said support member.

18. The cylinder piston device as set forth in claim 14, wherein said piston rod member remains telescopically movable with respect to said cylinder member along at least a major part of its normal operating range of movement in case of said fluid escape means being opened.

19. The cylinder piston device as set forth in claim 14, wherein said sealing unit comprises a seal member that is axially movable in part from said closing status to said opening status as a result of destruction of said sealing member upon the occurrence of emergency conditions.

20. The cylinder piston device as set forth in claim 19, further comprising means for preventing separation of said seal member from said cylinder piston device in case of axial movement of said part of said seal member from said closing status to said opening status.

21. The cylinder piston device as set forth in claim 14, wherein:
said at least one fluid passage is located at a location of said cylinder member axially outside said normal operational range of movement of said piston unit.

22. The cylinder piston device as set forth in claim 14, further comprising means for preventing separation of said sealing unit from said cylinder piston device in case of transfer of said sealing unit in whole or in part from said closing status to said opening status.

23. The cylinder piston device as set forth in claim 14, wherein said sealing unit is annular in cross section and is located adjacent to said first end of said cylinder member.

24. The cylinder piston device as set forth in claim 23, wherein said sealing unit is part of said piston rod guiding and sealing means.

25. The cylinder piston device as set forth in claim 14, wherein said at least one fluid passage and said sealing unit are located adjacent an end of said cylinder member remote from said piston rod guiding and sealing means.

26. The cylinder piston device as set forth in claim 14, wherein said sealing unit is a sliding sealing unit that is sealingly movable along a sliding face of said cylinder member, said at least one fluid passage intersecting said sliding face.

27. The cylinder piston device as set forth in claim 14, wherein said sealing unit support means is sensitive to a predetermined value of at least one of the pressure of said fluid and the temperature at a temperature-sensing location of said cylinder piston device.

28. The cylinder piston device as set forth in claim 27, wherein said sealing unit support means has a temperature-sensitive support capability which decreases with increasing temperature such that, at a predetermined value of temperature, the support capability is insufficient to maintain said sealing unit in said closing status against the action of said pressurized fluid.

29. The cylinder piston device as set forth in claim 14, wherein said sealing unit support means includes prestressed spring means.

30. The cylinder piston device as set forth in claim 14, wherein said sealing unit support means is axially supported adjacent an end thereof remote from said sealing unit by said piston rod guiding and sealing means.

31. The cylinder piston device as set forth in claim 23, wherein said sealing unit support means comprises an annular shearing zone.

32. The cylinder piston device as set forth in claim 31, wherein:
said sealing unit support means comprises two axially subsequent and radially off-set ring portions interconnected by a radial connection;
said radial connection comprising said annular shearing zone which is destroyable in response to a predetermined axial force exerted by said pressurized fluid through said sealing unit onto said sealing unit support means; and
said ring portions are telescopically movable with respect to each other in response to destruction of said radial connection.

33. The cylinder piston device as set forth in claim 32, wherein said radial connection is an integral part of said ring portions.

34. The cylinder piston device as set forth in claim 29, wherein said spring means comprises a stack of cup springs of the Belleville type.

35. The cylinder piston device as set forth in claim 14, wherein said at least one fluid passage comprises at least one bore extending in a radial direction through said circumferential wall at or adjacent said sealing unit.

36. The cylinder piston device as set forth in claim 14, wherein said at least one fluid passage comprises at least one substantially axially extending groove in said internal face of said circumferential wall adjacent said sealing unit.

37. The cylinder piston device as set forth in claim 14, wherein said sealing unit is axially supported against the pressure of said pressurized fluid by a support face of said sealing unit support means which supports only a part of the cross-sectional area of said sealing unit.

38. The cylinder piston device as set forth in claim 37, wherein:
said sealing unit is annular in cross section and is located radially between said circumferential wall and said piston rod member and
said sealing unit support means comprises an annular support face which supports only one of two radially adjacent ring portions of said sealing unit, said two ring portions being axially shearable relative to one another as a result of increased pressure of said pressurized fluid upon the occurrence of emergency conditions.

39. The cylinder piston device as set forth in claim 38, wherein said sealing unit comprises a resilient sealing material reinforced by a reinforcing ring member, said reinforcing ring member being provided with an annular weakened zone located between said radially adjacent ring portions and sensitive to shearing forces.

40. The cylinder piston device as set forth in claim 14, wherein said at least one fluid passage comprises a fluid collecting chamber within said cylinder member, said fluid collecting chamber having an exit to atmosphere.

41. The cylinder piston device as set forth in claim 14, wherein:
said guiding and sealing means comprises an annular guiding member having an integral guiding surface; and
said at least one fluid passage comprises at least one substantially axially extending groove in said guiding surface.

42. The cylinder piston device as set forth in claim 14, wherein said pressurized fluid is a pressurized gas.

43. The cylinder piston device of claim 1, wherein:
said fluid passage sealing means comprises an axially stationary, annular seal member which sealingly engages said piston rod member throughout said normal operating range of movement of piston unit; and
said at least one fluid passage is located in said piston rod member for bridging said annular seal member; said fluid passage being located outside said normal operating range of movement of the piston unit.

44. The cylinder piston device of claim 43, wherein said maintaining means includes a support member for normally preventing axial movement of said piston rod member to bring said fluid passage into bridging relation with said seal member and for permitting, upon the increase of at least one of the temperature and pressure beyond said respective predetermined values, axial movement of said piston rod member to bring said fluid passage into bridging relation with said seal member.

45. The cylinder piston device of claim 44, wherein said fluid passage comprises a reduced diameter portion of said piston rod member.

46. The cylinder piston device of claim 44, wherein said support member is comprised of heat fusible material.

47. The cylinder piston device of claim 46, wherein said support member comprises a sleeve member which is radially prestressed against the inner wall of said cylinder member.

48. In an apparatus including a stationary base member and a movable member pivotally connected to the base member for movement relative thereto through a first normal operational range of a movement; a cylinder member having an axis, a circumferential wall and two ends, said cylinder member defining a cavity therein between said two ends; a piston rod member extending through one end of the cylinder member; a piston unit carried by said piston rod member internally of said cylinder member; piston rod guiding and sealing means for sealingly guiding the piston rod member through said one end of the cylinder member for telescopic movement relative to the cylinder member throughout a second normal operational range of movement of said piston unit corresponding to said first operational range of movement; said second normal operational range of movement being less than the full possible range of movement of said piston unit relative to said cylinder member; a volume of pressurized fluid within said cavity and acting on said piston rod member; first means for pivotally connecting the free end of the cylinder member to one of the base member and the movable member; and second means for pivotally connecting the free end of the piston rod member to the other of the base member and the movable member; the improvement comprising:

- at least one of said first and second connecting means being destroyable or deformable upon the occurrence of at least one of excessive temperature or excessive fluid pressure within said cylinder so as to free said gas spring from connection to at least one of said base member and said movable member, respectively, and thereby permit said piston unit to move farther outward of said cylinder member under the force of said pressurized fluid to a first pressure-reduction position;
- means for permitting escape of fluid from said cavity under emergency conditions, said fluid escape means being located at least in part outside of the full possible range of movement of said piston unit outward relative to the cylinder member;
- the emergency fluid escape means including (1) at least one fluid passage coupling said cavity to atmosphere, (2) means for sealing said at least one fluid passage against fluid flow therethrough during normal operating conditions and for opening said at least one passage for fluid flow therethrough in emergency conditions, and (3) means for maintaining said fluid passage sealing means and said at least one fluid passage in mutually sealing relation with one another against the pressure of said fluid under normal operating conditions and for permitting axial movement of at least one of said fluid passage sealing means and said at least one fluid passage out of said mutually sealing relation with the other of said fluid passage sealing means and said at least one fluid passage under the action of said fluid pressure upon the occurrence of emergency conditions; and said maintaining means permitting said axial movement in response to the increase in at least one of temperature and pressure beyond respective, predetermined values, said respective predetermined values being greater than the respective values of temperature and pressure at which said at least one of said first and second connecting means is destroyable or deformable to free said gas spring.

49. The apparatus of claim 48, wherein:

the maintaining means comprises a heat-fusible member which engages a surface carried by said piston rod member to prevent said piston unit from moving outward beyond said first pressure-reduction position; and said heat-fusible member being fusible upon the occurrence of said predetermined value of temperature to permit said axial movement of said fluid passage sealing means and said at least one fluid passage out of said mutually sealing relation.

50. The apparatus of claim 49, wherein:

said fluid passage sealing means comprises an axially stationary, annular seal member which sealingly engages said piston rod member throughout said second normal operational range of movement of the piston unit; and said fluid passage is located in said piston rod member for bridging said annular seal member; said fluid passage being located outside said second normal operational range of movement of the piston unit.

51. The apparatus of claim 50, wherein, upon the increase of the temperature beyond said respective predetermined value, said heat-fusible member melts to permit said piston rod member to move axially outward beyond said first pressure-reduction position to bring said fluid passage into bridging relation with said seal member.

52. The apparatus of claim 51, wherein said fluid passage comprises a reduced diameter portion of said piston rod member.

53. The apparatus of claim 52, wherein said support member comprises a sleeve member which is radially prestressed against the inner wall of said cylinder member.

* * * * *

UNITED STATES PATENT AND TRADEMARK OFFICE
CERTIFICATE OF CORRECTION

PATENT NO. : 5,735,371
DATED : April 7, 1998
INVENTOR(S) : Klaus-Dieter Jobelius, et. al.

It is certified that error appears in the above-identified patent and that said Letters Patent is hereby corrected as shown below:

Col. 8, line 16, "persists" should read --persist--;
Col. 9, line 40, "destruction" should read --destruction of--;
Col. 12, line 51, "piston" should read --said piston--;
Col. 14, line 13, "respective," should read --respective--.

Signed and Sealed this

Twenty-second Day of September, 1998

Attest:

BRUCE LEHMAN

Attesting Officer     Commissioner of Patents and Trademarks